(12) United States Patent
Janumpally et al.

(10) Patent No.: US 11,210,504 B2
(45) Date of Patent: Dec. 28, 2021

(54) EMOTION DETECTION ENABLED VIDEO REDACTION

(71) Applicant: Hitachi Vantara LLC, Santa Clara, CA (US)

(72) Inventors: Meghana Janumpally, Santa Clara, CA (US); Chun Wai Lee, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 128 days.

(21) Appl. No.: 16/610,948

(22) PCT Filed: Sep. 6, 2017

(86) PCT No.: PCT/US2017/050152
§ 371 (c)(1),
(2) Date: Nov. 5, 2019

(87) PCT Pub. No.: WO2019/050508
PCT Pub. Date: Mar. 14, 2019

(65) Prior Publication Data
US 2020/0074156 A1    Mar. 5, 2020

(51) Int. Cl.
*G06K 9/00* (2006.01)
*G06F 16/783* (2019.01)
(Continued)

(52) U.S. Cl.
CPC ........... *G06K 9/00315* (2013.01); *G06F 9/54* (2013.01); *G06F 16/784* (2019.01);
(Continued)

(58) Field of Classification Search
CPC ............ G06K 9/00302; G06K 9/6201; G06K 2209/21; G06K 9/00295; G06K 9/00744; G06K 2009/00939; G06K 9/00281; G06K 9/00885; G06K 9/00335; G06K 9/00315; G06K 9/00255; G06K 9/00288;
(Continued)

(56) References Cited

U.S. PATENT DOCUMENTS 7,231,657 B2    6/2007    Honarvar et al.
7,593,551 B2    9/2009    Kamei
(Continued)

OTHER PUBLICATIONS

Corpus Development for Affective Video Indexing (Year: 2014).*
(Continued)

*Primary Examiner* — Nizar N Sivji
(74) *Attorney, Agent, or Firm* — Mattingly & Malur, PC

(57) ABSTRACT

In some examples, a computer system may receive video from one or more video sources. The computer system may detect a plurality of faces in a first video portion of the received video. Further, the computer system may determine that a first face of the plurality of faces has features indicative of an emotion of interest. Based on determining that the first face has the features indicative of the emotion of interest, the computer system may redact other faces of the plurality of faces while leaving the first face unredacted in the first video portion. The computer system may send the first video portion with the first face unredacted and the other faces redacted to at least one computing device.

20 Claims, 8 Drawing Sheets

(51) Int. Cl.
  *G06F 9/54*     (2006.01)
  *G06K 9/62*     (2006.01)
  *G06F 3/0484*   (2013.01)

(52) U.S. Cl.
  CPC ..... *G06K 9/00255* (2013.01); *G06K 9/00288* (2013.01); *G06K 9/00744* (2013.01); *G06K 9/6201* (2013.01); *G06F 3/04845* (2013.01); *G06K 2209/21* (2013.01)

(58) Field of Classification Search
  CPC .. G06K 9/00; G06K 9/00778; G06F 3/04845; G06F 3/013; G06F 16/784; G06F 9/54
  See application file for complete search history.

(56) References Cited

U.S. PATENT DOCUMENTS

| | | | |
|---|---|---|---|
| 9,405,962 | B2 | 8/2016 | Balasubramanian et al. |
| 9,443,167 | B2 | 9/2016 | Movellan et al. |
| 9,576,190 | B2 | 2/2017 | Shaburov et al. |
| 9,767,349 | B1* | 9/2017 | Shreve ............... G06K 9/00315 |
| 10,187,690 | B1* | 1/2019 | Garcia ............. H04N 21/44008 |
| 2004/0081338 | A1* | 4/2004 | Takenaka ........... G08B 13/1961 382/118 |
| 2011/0263946 | A1* | 10/2011 | el Kaliouby ....... G06K 9/00335 600/300 |
| 2016/0358013 | A1* | 12/2016 | Carter ..................... G06F 21/32 |
| 2017/0154211 | A1* | 6/2017 | Shaburov ............. G06K 9/6209 |
| 2017/0178287 | A1* | 6/2017 | Anderson .......... G06K 9/00228 |
| 2017/0319123 | A1* | 11/2017 | Voss ....................... G16H 30/40 |

OTHER PUBLICATIONS

Heterogeneous Knowledge Transfer in Video Emotion Recognition, Attribution and Summarization (Year: 2018).*
Video Affective Content Analysis: A Survey of State-of-the-Art Methods (Year: 2015).*
Creating Video Summarization From Emotion Perspective (Year: 2016).*
Editing by Viewing: Automatic Home Video Summarization by Viewing Behavior Analysis (Year: 2011).*
A Robust Method for Face Recognition and Face Emotion Detection System using Support Vector Machines (Year: 2016).*
International Search Report of PCT/US2017/050152 dated Nov. 13, 2017.

* cited by examiner

| Priority | Identity ID | Priority Score | Emotion(s) |
|---|---|---|---|
| 1 | 10009 | 90% | Angry 90 - Normal 10 |
| 2 | 10002 | 70% | Angry 30 - Frustrated 40 - Sad 30 |
| 3 | 10018 | 40% | Frustrated 40 - Normal 30 - Happy 30 |
| ... | ... | ... | ... |

FIG. 4

EMOTION DETECTION ENABLED VIDEO REDACTION

TECHNICAL FIELD

This disclosure relates to the technical field of video processing, such as for security, surveillance, video monitoring, or the like.

BACKGROUND

Surveillance, such as video security monitoring, is used by governments, corporations, and other entities for prevention of crime, investigation of crime, and/or protecting the security of people, objects, or the like. However, security monitoring of large crowds and/or using many cameras can be tedious and difficult for a human to perform. In the case of large crowds and/or a large number of video feeds, it can be impossible for humans to examine and monitor each person in each individual video feed, such as when there are hundreds of video feeds, each of which may include hundreds of individuals. Furthermore, video surveillance may be considered a violation of privacy in some applications. Accordingly, the use of video surveillance may be restricted in some circumstances, such as by limiting video surveillance to situations where public safety may be a concern. However, even in public places, the privacy of individuals may still be degraded by constant video surveillance.

SUMMARY

Implementations herein include arrangements and techniques for processing video. In some examples, a computer system may receive video from one or more video sources. The computer system may detect a plurality of faces in a first video portion of the received video. Further, the computer system may determine that a first face of the plurality of faces has features indicative of an emotion of interest. Based on detecting the features indicative of the emotion of interest in the first face, and not in other faces of the plurality of faces, the computer system may redact the other faces of the plurality of faces in the first video portion. The computer system may send the first video portion with the first face unredacted and the other faces redacted to at least one computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example priority data structure according to some implementations.

DESCRIPTION OF THE EMBODIMENTS

Figure 1:
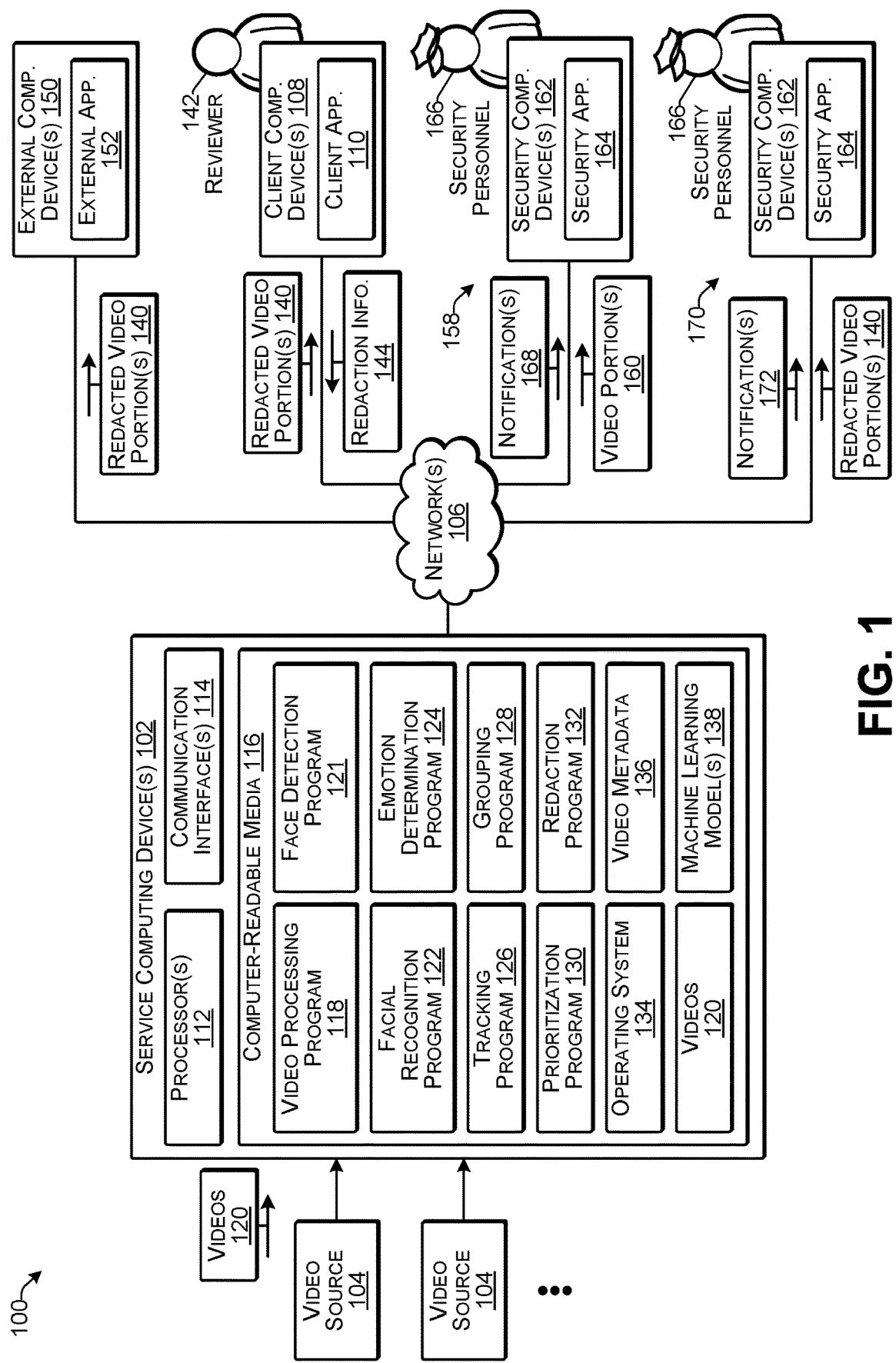
FIG. 1 illustrates an example architecture of a computer system able to process and analyze video for identifying portions of video having targeted features and redacting portions of the video having non-targeted features according to some implementations.

Some implementations herein are directed to techniques and arrangements for an image processing system that is configured to analyze batches of video for identifying portions of video that include certain features and redacting some other portions of the video that do not include the certain features. For example, a system may analyze batches of video for performing face detection, facial recognition, and grouping of faces recognized as corresponding to the same individuals. The system may further perform recognition of emotions on the faces to determine any facial features that indicate an emotion of interest that may be indicative of a targeted potential intent. Video portions containing an individual targeted as possibly being of interest may be grouped together based on the grouping of recognized faces. Further, the faces of other non-targeted individuals appearing in the video portions that include a targeted face may be redacted, such as by blurring, or the like, to render the face unrecognizable for protecting the privacy of the non-targeted individuals when the video portion is to be shared with an external computing device. Prior to sharing of the video portion, the video portion including the targeted individual and the redacted faces of the non-targeted individuals may be forwarded to a client device and presented in a user interface for review by a human to check for any unredacted faces.

In a system for processing surveillance video, the same person may appear multiple times in multiple video portions from the same or different video sources. Accordingly, the system herein may group faces from different video portions that are recognized using facial recognition as belonging to the same identity. The system may group together different video portions including appearances of the same person in a grouping data structure based on determining that the different video portions include faces belonging to the same identity.

In some examples, new identities are added to the grouping data structure whenever a new face cannot be matched to faces already associated with identities in the grouping data structure. Furthermore, the detected faces may be analyzed to detect any features in the faces that indicate emotions that may be interest, such as anger, frustration, or the like. The grouped faces along with the identified emotion(s) may subsequently be ranked or otherwise prioritized based on the identified emotion and an estimated severity of the emotion. After identifying one or more targeted faces of interest based on the priority information, the image processing system may send the video portion with an alert or other notification to a security computing device or alternatively, such as in case of processing the video after a crime has been committed, add the video portion as an assets to a case folder of a law enforcement agency.

Additionally, or alternatively, the video portion may be prepared for being accessed by members of the public or other organizations, while also protecting the privacy of the faces of non-targeted individuals in the video portion. As one example, the faces of the non-targeted individuals may be redacted, such as by blurring or otherwise obscuring the faces of the non-targeted individuals in the video portion. Consequently, only the faces of one or more targeted individuals identified as being of interest may remain unredacted in the video portion, which may then be provided to the news media or other public entity, or otherwise made publicly available.

The system includes an emotion determination algorithm for determining emotions based on analysis of specific facial features indicative of, e.g., anger, frustration, hatred, distress, or other emotions that may be indicative of potential for bad acts. Through the analysis, the system may detect minute expressions by analyzing different relationships between points in the detected faces. In some cases, the system may single out the same faces in different video portions and group the faces according to an identity, location of video setting, time at which the video was recorded, and/or duration of an identified emotion. The system may also determine the severity of a detected emotion, e.g., based on frequency and/or duration of the emotion, and may prioritize the individual identities based on this information. For example, if a person is very angry and is detected as being angry 9 out of 10 times in the video (i.e., based on 9 out of 10 samples from 10 different frames in the video portion), or 90 percent of the time, that person may be ranked higher in the priority data structure, and security personnel may receive an alert or other notification along with copies of the corresponding video portion(s). On the other hand, if the system determines that a person is angry 3 out of 10 times in the video portion(s), or 30 percent of the time, that person may be ranked lower in the priority data structure. Thus, the priority data structure allows the security personnel to focus initially on an individual who may be a greater threat and take appropriate action as necessary.

As mentioned above, images and/or videos of crowded areas may present a problem when protecting the privacy of individuals. For example, to have human reviewers manually review and redact images of non-targeted individuals to enable images of targeted individuals to be made publicly available would require a large amount of human resources, and therefore is not practical in many use cases. Accordingly, implementations herein enable automatic redaction of non-targeted individuals from portions of video. Furthermore, some examples include enabling a reviewer to make manual adjustments of areas to be redacted prior to making the video portion publicly available or otherwise available to others outside of the organization.

Human emotion can be read in facial expressions based on facial features detected using facial recognition machine learning models. These emotions can convey intent of action. Implementations herein are able to automatically detect a pattern of facial expression in a video portion and identify facial features that represent patterns of anger, distress, frustration, hatred, or the like. Some examples automatically detect upset and angry individuals in a crowd for notifying security personnel in real time or near real time, such as for preventing a bad act, and/or for evidence gathering after a crime has been committed. Some examples herein may enable detection of any frustrated or angry individuals in a crowd in real time or near real time using live streams, and the system may send an alert or other notification to security personnel to track an individual that is perceived as having potential to commit a crime. Further, the examples herein may automatically redact non-targeted faces when publishing the videos such as for media or other public access. Accordingly, the identity and privacy of the non-targeted people are preserved and the investigation can concentrate on the targeted individuals.

For discussion purposes, some example implementations are described in the environment of a computer system that determines individuals who may be of interest based on video analysis and processing. However, implementations herein are not limited to the particular examples provided, and may be extended to other types of environments, other system architectures, other use cases, and so forth, as will be apparent to those of skill in the art in light of the disclosure herein.

FIG. 1 illustrates an example architecture of a computer system 100 able to process and analyze video for identifying portions of video having targeted features and redacting portions of the video having non-targeted features according to some implementations. The system 100 includes at least one service computing device 102 that is able to communicate directly or indirectly with one or more video sources 104. For example, the video sources 104 may be cameras and/or video storage directly connected to the service computing device 102, may be connected through one or more networks, may be another computing device that streams video to the service computing device 102, such as through a network, may be a cloud storage location or other network or local storage location that the service computing device 102 accesses to retrieve the video, any combination of the foregoing, or other configurations, as will be apparent to those of skill in the art having the benefit of the disclosure herein.

The service computing device 102 may further communicate over one or more networks 106 with one or more client computing devices 108, each of which may include a client application 110. In some examples, the service computing device 102 may include one or more servers, personal computers, embedded processors, or other types of computing devices that may be embodied in any number of ways. For instance, in the case of a server, the applications, programs, other functional components, and at least a portion of data storage may be implemented on at least one server, such as in a cluster of servers, a server farm or data center, a cloud-hosted computing service, and so forth, although other computer architectures may additionally or alternatively be used.

In the illustrated example, the service computing device 102 includes, or otherwise may have associated therewith, one or more processors 112, one or more communication interfaces 114, and one or more computer-readable media 116. Each processor 112 may be a single processing unit or a number of processing units, and may include single or multiple computing units, or multiple processing cores. The processor(s) 112 may be implemented as one or more central processing units, microprocessors, microcomputers, microcontrollers, digital signal processors, state machines, logic circuitries, and/or any devices that manipulate signals based on operational instructions. For instance, the processor(s) 112 may be one or more hardware processors and/or logic circuits of any suitable type specifically programmed or configured to execute the algorithms and processes described herein. The processor(s) 112 may be configured to fetch and execute computer-readable instructions stored in the computer-readable media 116, which can program the processor(s) 112 to perform the functions described herein.

The computer-readable media 116 may include volatile and nonvolatile memory and/or removable and non-removable media implemented in any type of technology for storage of information such as computer-readable instructions, data structures, program modules, or other data. For example, the computer-readable media 116 may include, but is not limited to, RAM, ROM, EEPROM, flash memory or other memory technology, optical storage, solid state storage, magnetic tape, magnetic disk storage, RAID storage systems, object storage systems, storage arrays, network attached storage, storage area networks, cloud storage, or any other medium that can be used to store the desired information and that can be accessed by a computing device. Depending on the configuration of the service computing device 102, the computer-readable media 116 may be a tangible non-transitory medium to the extent that, when mentioned, non-transitory computer-readable media exclude media such as energy, carrier signals, electromagnetic waves, and/or signals per se. In some cases, the computer-readable media 116 may be at the same location as the service computing device 102, while in other examples, the computer-readable media 116 may be partially remote from the service computing device 102.

The computer-readable media 116 may be used to store any number of functional components that are executable by the processor(s) 112. In many implementations, these functional components comprise executable instructions and/or programs that are executable by the processor(s) 112 and that, when executed, specifically program the processor(s) 112 to perform the actions attributed herein to the service computing device 102. Functional components stored in the computer-readable media 116 may include a video processing program 118. The video processing program 118 may include one or more computer programs, computer-readable instructions, executable code, or portions thereof that are executable to cause the processor(s) 112 to perform various tasks, such as for processing videos 120 received from the one or more video sources 104. In the illustrated example, when processing the videos 120, the video processing program 118 may include or may access a face detection program 121, a facial recognition program 122, an emotion determination program 124, a tracking program 126, a grouping program 128, a prioritization program 130, and a redaction program 132.

Each of these functional components 121-132 may be an executable module of the video processing program 118, or a portion thereof. Alternatively, in other examples, some or all of these components 121-132 may be separately executable stand-alone computer programs. Additionally, the functional components in the computer-readable media 116 may include an operating system 134 that may control and manage various functions of the service computing device 102. In some cases, the functional components may be stored in a storage portion of the computer-readable media 116, loaded into a local memory portion of the computer-readable media 116, and executed by the one or more processors 112. Numerous other software and/or hardware configurations will be apparent to those of skill in the art having the benefit of the disclosure herein.

In addition, the computer-readable media 116 may store data and data structures used for performing the functions and services described herein. For example, the computer-readable media 116 may store the videos 120 and video metadata 136. In some examples, the videos 120 may be stored in a separate object storage system including various types of backup or other redundancy capabilities, and configured to delete certain ones of the videos 120 after the elapse of a predetermined time, retain others of the videos 120 for a predetermined retention period, and so forth. However, implementations herein are not limited to any particular storage apparatus or technique for the videos 120 or portions thereof.

In addition, the video metadata 136 may include facial recognition information, emotion recognition information, grouping information, priority information, redaction information, associated notifications sent, e.g., to a security computing device, and other information and data structures, as discussed additionally below. In some examples, the video metadata 136 may be maintained in whole or in part in a metadata database or other metadata data structure(s).

In addition, the computer-readable media may store one or more machine learning models 138, which may be used by one or more of the functional components, such as the face detection program 121, the facial recognition program 122, the emotion determination program 124, the tracking program 126, the grouping program 128, the prioritization program 130, and/or the redaction program 132. Examples of such machine learning models 138 include predictive models, decision trees, classifiers, regression models, such as linear regression models, support vector machines, and stochastic models, such as Markov models and hidden Markov models, artificial neural networks, such as recurrent neural networks, and so forth.

The communication interface(s) 114 may include one or more interfaces and hardware components for enabling communication with various other devices, such as over the one or more networks 106. Thus, the communication interfaces 114 may include, or may couple to, one or more ports that provide connection to the network(s) 106 for communicating with the sensor(s) 104, the equipment 108, and/or the user computing device(s) 110. For example, the communication interface(s) 114 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel,), direct connections, as well as close-range communications, such as BLUETOOTH®, and the like, as additionally enumerated below.

The one or more networks 106 may include any type of network, including a LAN, such as an intranet; a WAN, such as the Internet; a wireless network, such as a cellular network; a local wireless network, such as Wi-Fi; short-range wireless communications, such as BLUETOOTH®; a wired network including fiber optics, Ethernet, Fibre Channel, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device(s) 102, the client computing device(s) 108, other computing devices described below, and in some examples, the video sources 104, are able to communicate over the one or more networks 106 using wired or wireless connections, and combinations thereof.

In some implementations, the service computing device 102 may receive the videos 120 from the one or more video sources 104, such as by streaming or download. For instance, the video processing program 118 may store the received videos 120 in the computer-readable media 116. Subsequently, the video processing program 118 may perform video processing on the received videos 120. For instance, the video processing program 118 may invoke the face detection program 121 and facial recognition program 122 for detecting and recognizing faces in the videos 120. In some cases, the face detection program 121 may be part of the facial recognition program 122, while in other cases, the face detection program 121 may be a separate program.

Further, the video processing program 118 may invoke the tracking program 126 for tracking individual faces in a video portion. The grouping program 128 may be invoked for grouping together different video portions that include the same recognized face as belonging to a single identity. The video processing program 118 may invoke the emotion determination program 124 for recognizing emotions in the detected faces, such as for determining those video portions that include a person with a detected emotion that may be of interest, such as anger, frustration, hatred, distress, or the like. Further, the prioritization program 130 may be invoked by the video processing program 118 to rank the recognized faces according to a priority based on severity and/or frequency of the determined emotion. The video processing program 118 may then determine the video portions to redact for providing public access to the video portion, and may redact the faces of non-targeted people from the video portion, such as by blurring out the faces of non-targeted people or using other video effects to obscure the faces and make the faces unrecognizable.

In some examples, a redacted video portion 140 that has been redacted to obscure the faces of non-targeted people, such as for providing the video portion 140 to the media or other members of the public, first may be sent to the client computing device 108 and presented on a user interface (UI) to be reviewed by a human reviewer 142 prior to providing public access to the redacted video portion 140. For example, the client computing device 108 may execute the client application 110 for receiving the redacted video portion 140 from the service computing device 102, which may cause the client application 110 to present the redacted video portion 140 in the UI (not shown in FIG. 1). The reviewer 142 may review the redacted video portion 140 to determine if there are any non-targeted faces that should have been redacted, but are not. The reviewer 142 may use the client application 110 to mark or otherwise identify the unredacted non-targeted faces, and the client application 110 may send redaction information 144 back to the video processing program 118 to instruct the video processing program 118 to perform further redaction on the redacted video portion 140.

In response, the video processing program 118 may provide the redaction information 144 to the redaction program 132, which may perform additional redaction on the redacted video portion 140. In some cases, the reviewer 142 may again review the updated version of the redacted video portion 140. In other cases, the updated version of the redacted video portion 140 may be provided directly to an external computing device 150 without additional review by the review 142. Additionally, in the case that no update is required to the redacted video portion 142 when reviewed by the reviewer 142, the redacted video portion 140 may be sent to an external computing device 150, or otherwise approved to be sent to the external computing device 150, such as for making the redacted video portion 140 publicly available.

The external computing device 150 may include an external application 152 that executes on the external computing device 150 for receiving the redacted video portion 140 from the service computing device 102. In some examples, the external computing device 150 may be a web server or the like that makes the redacted video portion(s) 140 available to members of the public, such as to the press, news media, or other members of the public having an interest in the subject matter of the video portion 140.

In addition, prior to performing any redaction and, in some examples, in real time or near real-time the video processing program 118 may determine a priority associated with one or more video portions 160, and, as indicated at 158, may send the video portion(s) 160 associated with higher priority identity to a security computing device 162. For example, the security computing device 162 may include a security application 164 executed by the security computing device 162 for presenting the one or more video portions 160 in a UI to security personnel 166. For example, the video portion 160 may include a face of interest highlighted, circled, or otherwise visually distinguished in the video portion 160.

Additionally, in some examples, the video processing program 118 may send one or more notifications 168 associated with the one or more video portions 160. As one example, the video processing program 118 may send the notification 168 and/or the video portions 160 via an application programming interface (API) to the security application 164 on the security computing device 162. For instance, the notification 168 may include an alert, may indicate one or more of the video portions 160 that are high priority, and/or may indicate the priority score of each individual not redacted in the video portion(s) 160. For example, the notification 168 may indicate that the individual's face presents features that indicate anger, and may further indicate a level of severity, such as base on a measured duration of the detected emotion.

In some examples, the receipt of the video portions 160 and/or the notification 168 by the security application 164 may cause the security application 164 to present a UI that displays the video portion(s) 160 and/or the notification 168. The security personnel 166 at the security computing device 162 may view the UI to view the video portions 160 and/or the notification 168. Accordingly, the security personnel 166 only has to review a relatively small amount of the video, rather than having to review a large amount video from multiple sources. Thus, the security personnel 166 may receive and review the relevant portion of the video portion 160 in near real time.

Additionally, in some examples, as indicated at 170, the video provided to law enforcement or other security personnel 166 may have the non-targeted faces redacted, i.e., the redacted video portion(s) 140 may be provided to the security personnel 166. The redaction in this case may enable the security personnel 166 to quickly review and identify possible threats by providing images of only the targeted faces while the other faces in the video portion 140 are redacted out by blurring or the like. Further, in this example, the redacted video portion(s) 140 might not be reviewed by the reviewer 142 first, but instead may be sent to one or more of the security computing devices 162 in close to real time, as indicated at 170. Alternatively, of course, in other examples, the redacted video portion(s) 140 may be sent after being reviewed by the reviewer 142, but this may cause additional delay in enabling the security personnel 166 to review the video portions 140. One more notifications 172 may also be sent with the redacted video portions 140, such as for indicating a priority and/or severity an identified emotion for a targeted individual in the redacted video portion(s) 140. Furthermore, after the detection of a person of interest, and redaction is performed, the security personnel 166 can select the face exhibiting the identified emotions e.g., angry, frustrated, etc., and run a profile search using other third party applications to analyze whether the targeted individual is already on a watch list or belongs to any monitored organization.

Thus, the system 100 herein provides a significant improvement over conventional video surveillance systems by drastically reducing the amount of video human security personnel 166 must review, saving significant time. As mentioned above, as video cameras become cheaper and more interconnected within broader security monitoring systems, more cameras can be present and used at a sports venue, mall, theme park, airport, busy area of a city, etc., than can be feasibly monitored by humans. Video feeds are now so numerous that they can no longer be monitored manually in a conventional manner Additionally, it is desirable that public access to recorded videos be limited to safeguard the privacy of the people whose images are captured on the videos.

The examples herein detect facial features that signal emotions like anger, frustration, etc., which can provide critical information if detected in time. Thus, the facial monitoring of a crowd, as described herein may provide a valuable tool for detecting people in the crowd who have the potential for committing a crime or other bad act. Accordingly, implementations herein may detect an individual showing signs of strong emotion and/or instability, and may provide law enforcement or other security personnel sufficient time to react and apprehend the individual.

In addition, implementations herein may be used to gather evidence in a criminal investigation after the occurrence of a crime. In this case, the computer system may analyze a large number of video portions to detect individuals having the potential to commit the crime. The system can analyze stored video to detect any angry/anxious/frustrated faces who are more likely to be perpetrators of the crime. When a possible suspect is identified in a video portion, and it is desired to make the video portion available to the public, such as for seeking public assistance in identifying or locating the individual, the system may automatically redact the non-targeted faces in the video portion. Accordingly, the other faces not portraying an emotion of interest are not subjected to public scrutiny, such as on a media and/or news channel, but instead, the non-targeted faces are automatically redacted from the video portion based on not exhibiting features corresponding to a targeted emotion, leaving the suspect's face shown for further investigation. Accordingly, implementations herein may employ facial recognition, face tracking, identity grouping, emotion detection, and video redaction for purposes of evidence gathering and dissemination in law enforcement investigations. For example, using the video analytics herein, massive amounts of video and individual faces in crowds are analyzed without the need for added video monitoring by security personnel. Furthermore, even in very crowded areas, targeted individuals can be picked out while the privacy of the other individuals in the crowd may be protected by redaction.

The client computing device 110, the external computing device(s) 150, and the security computing device(s) 162 may be any suitable type of computing device such as a desktop, workstation, server, laptop, tablet computing device, mobile device, smart phone, wearable device, or any other type of computing device able to send and receive data over a network. In some cases, the computing devices 110, 150, and/or 162 may include hardware configurations similar to that described for the service computing device 102, but with different data and functional components to enable them to perform the various functions discussed herein. Furthermore, the computing devices 110, 150, and/or 162 may be able to communicate with the service computing device 102 through the one or more networks 106 or through any other suitable type of communication connection. Additionally, while one example of a client-server configuration is described herein, numerous other possible variations and applications for the system 100 will be apparent to those of skill in the art having the benefit of the disclosure herein.

Figure 2:
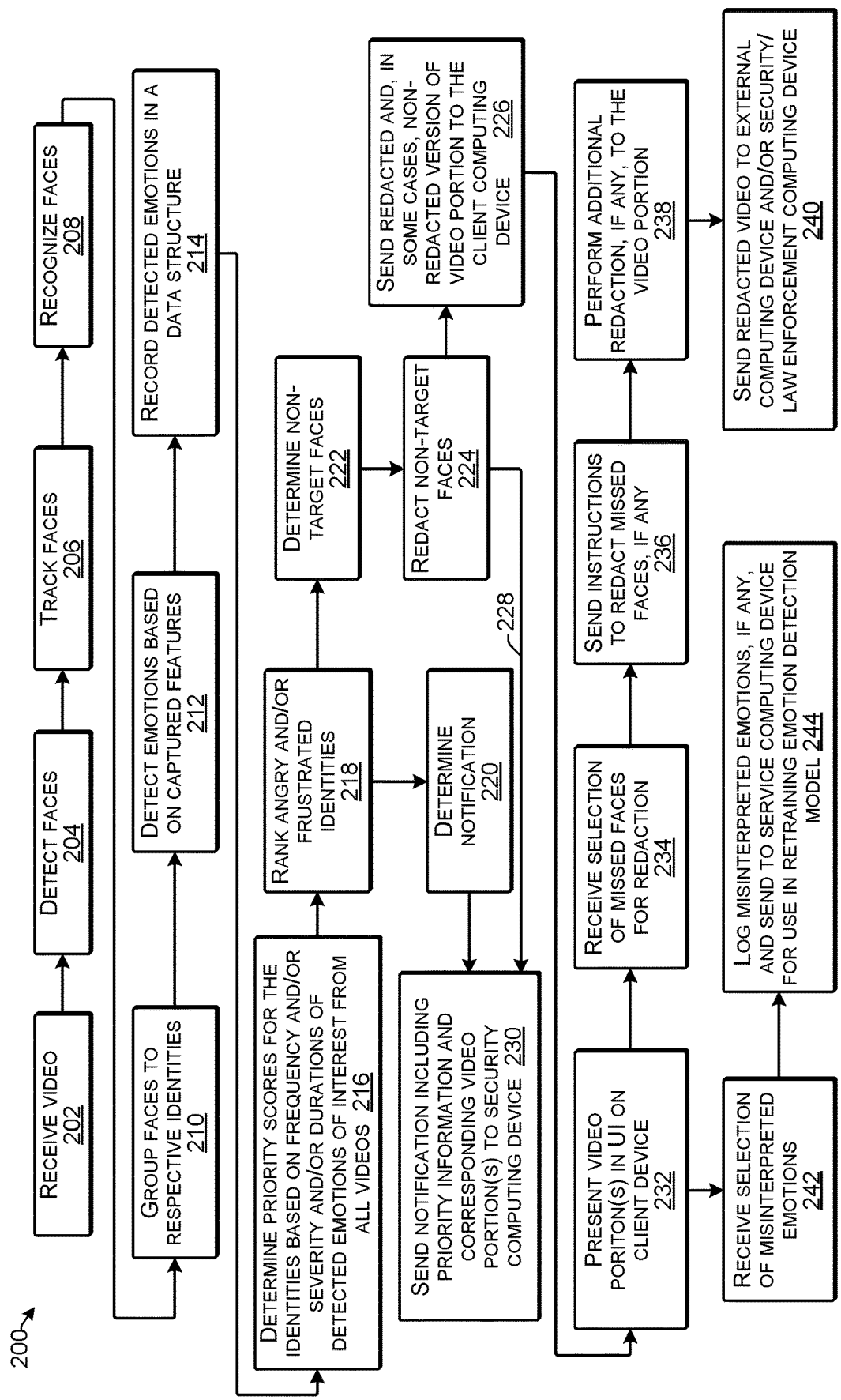
FIG. 2 is a flow diagram illustrating an example process for processing video based on detecting features indicative of emotions of interest according to some implementations.

FIG. 2 is a flow diagram illustrating an example process 200 for processing video based on detecting features indicative of emotions of interest according to some implementations. The process 200 is illustrated as a collection of blocks in a logical flow diagram, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

In some examples, one or more components of the video processing program 118 and other functional components discussed above with respect to FIG. 1 may be executed by the one or more processors of the service computing device 102 to cause the service computing device 102 to perform a portion of this process, while another portion of the process may be executed on the client computing device 108 discussed above.

The process 200 enables large batches of video to be analyzed for detecting specific facial features indicating anger, frustration, or the like. The process 200 may detect these minute expressions by analyzing the different relationships between points and other features in faces detected in the video portions. The faces detected as having features indicating emotions of interest may be singled out and tracked. Further, if the same face appears in more than one video portion, these video portions may be grouped to the same identity based on matching recognized faces to the same identity. The grouping of the faces in the multiple video portions may be performed using facial recognition matching techniques, and therefore, the algorithm is able to group multiple appearances of an individual into a single identity in a grouping data structure, such as based on a threshold level of confidence of a match between two face images, or the like.

In addition, for individuals detected as having facial features indicating an emotion of interest, such as anger, frustration, etc., a priority score may be assigned and the identities may be ranked in a priority data structure based on the priority scores. In some examples, the video portion may be delivered to a security computing device in real time or near real time in either unredacted or redacted format. Additionally, or alternatively, in some examples the redacted video portion is sent to a reviewer at a client computing device who ensures that all the non-targeted faces have been redacted before the video portion is viewable by members of the public or other people outside of the organization. For instance, due to the time delay in having a video portion reviewed by a reviewer, the latter example may be performed more often in the case of a criminal investigation, such as after a crime has already been committed, or the like.

At 202, the computing device may receive video for processing from a video source. In some examples, the video may be streamed in real time from a camera, or the like. In other examples, the video may have been stored previously, and may be analyzed at a later time such as for a law enforcement investigation.

At 204, the computing device may detect faces in a portion of the video. For example, the video may be divided into portions based on time intervals or other factors. The computing device may use the facial recognition program discussed above to detect faces in the video. In some examples, the division of the video into video portions (e.g., video clips) may be performed after an individual of interest is identified so that a video clip contains the individual of interest for the entire time that the individual of interest is within a field of view of the camera recording the video. In other examples, the videos may be divided into video portions based on uniform time intervals or other considerations, and the video portions may be subsequently concatenated if a targeted individual is present in multiple video portions. Numerous other variations will be apparent to those of skill in the art having the benefit of the disclosure herein.

At 206, the computing device may track the detected faces in a current video portion. In addition, in some examples, facial recognition may be performed first to enable tracking of a face in a current video portion as well as in other video portions from the same or different video sources. In either event, each face in the video portion may be tracked for use in the subsequent redaction of faces from the video portion and/or for tracking the position of the face of a targeted individual.

At 208, the computing device may perform recognition processing on the detected faces in the video portion. For example, the computing device may execute a facial recognition algorithm on the faces to recognize these faces based on unique landmarks and other features. In some cases, the faces may be decomposed into features that can be used during grouping for comparison with any faces already included in a grouping data structure of previously recognized identities. If there is no entry in the grouping data structure having a matching face that matches the recognized face, a new entry may be created in the grouping data structure.

At 210, the computing device may group faces to respective identities in the grouping data structure. For example, faces that are determined within a threshold level of confidence to belong to the same person are associated with the same identity in the grouping data structure. If there is no entry in the grouping data structure having a matching face that matches the recognized face, a new entry may be created in the grouping data structure. The grouping program may access videos from nearby cameras to detect the same face in other video feeds, and may group these different video portions together in the grouping data structure based on recognizing the same face in the multiple different video portions.

At 212, the computing device may detect emotions in the detected faces. For example, the computing device may execute the emotion detection program, which may use a trained machine learning model for determining which emotion of a number of possible emotions a particular individual may be experiencing, such as anger, happiness, sadness, frustration, surprise, neutral, and so forth. As discussed additionally below, the emotion detection program may examine and compare a plurality of facial features on each face of an individual in comparison with features included in the machine learning model for determining an emotion indicted by the features detected on each individual face in the video portion. The emotion detection program may perform the analysis on individual frames of the video portion, such as by sampling and performing analysis on frames every 5 seconds, 10 seconds, 20 seconds, 30 seconds or the like.

At 214, the computing device may record the detected emotions in a data structure. For example, the computing device may record the detected emotions in the grouping data structure for the corresponding identity determined using the facial recognition. For example, the data structure may identify the video portion and the duration of the detected emotion for each different emotion detected for each individual. In some cases, the X-Y coordinates of the faces in the frames of the video portions, as determined by the tracking program, may be stored in the grouping data structure as well for a plurality of points in time, while in other examples, the tracking information may be stored in a separate data structure.

At 216, the computing device may determine priority scores for the identities based on a frequency and/or severity and/or duration of the detected emotions of interest from all videos in which the respective individual appears. For example, for a selected time frame and/or location, the computing device may execute the prioritization program to determine a priority score for each individual who has been recognized as having one or more emotions of interest, such as anger, frustration, etc., as detected in all videos from one or more video sources. As one example, the priority score may be determined based on a measured duration of the emotion of interest, which may correspond to a severity the emotion for the individual. For example, an individual who is detected as being angry in nine out of 10 samples and neutral in the other sample may have a priority score of 90 assigned. On the other hand, an individual who is detected as being angry in two out of 10 samples and neutral, sad, happy, etc., in the other eight out of 10 samples may only have a priority score of 20 assigned. In some cases, the individual may need to have a priority score larger than a threshold number, such as 30 to become a person of interest that is tracked or matched to an identity in the grouping data structure.

At 218, the computing device may rank the identities including anger and/or frustration as identified emotions based on the priority score determined at 216. For example, when determining the ranking, the identities having the higher priority scores are ranked higher in a priority data structure, as discussed additionally below. For example, the prioritization program may rank the identities in a priority data structure based on the priority scores.

At 220, in the examples herein in which the video is provided to a security computing device with or without redaction, e.g. in near real time, then following the determination of the ranking of the identities, the computing device may determine a notification to include with the video portion to be sent to the security computing device.

At 222, the computing device determine non-targeted faces in the video portion. For example, as mentioned above at 206, the faces in the video portion may be detected and tracked. The faces that are associated with non-targeted identities, i.e., identities that did not include features indicating an emotion of interest, may be identified for redaction. For example, the tracking information for each face may be used for determining the coordinates of faces to be redacted.

At 224, the computing device may redact the non-targeted faces identified in the video portion. For instance, the computing device may use any of various effects for redacting the non-targeted faces, such as by blurring out the non-targeted faces, covering the non-targeted faces with a design, a solid color, or the like. By redacting the non-targeted faces, the targeted unredacted faces in the video portion remain visible to a person viewing the video portion, while the redacted faces are not recognizable.

At 226, the computing device may send the redacted video portion, and in some cases the non-redacted version of the video portion, to the client computing device for review by a reviewer.

At 228, in the examples in which a redacted version of the video portion is forwarded to the security computing device without review by the reviewer, the computing device may send the redacted video portion to the security computing device along with the notification determined at 220. For instance, in some cases, since the security computing device typically is associated with the same entity as the service computing device, and accordingly, the video is not being shared outside the organization, redaction may not be necessary for protecting the privacy of the individuals viewable in the video portion. In this case, the video portion may just include a visual indicator of the face(s) of the person(s) of interest.

Alternatively, in some cases the automated redaction may nevertheless be useful for assisting the security personnel by isolating an individual in the video portion. Accordingly, in these examples, redaction of non-targeted faces may be performed with very little additional time cost and the redacted version of the video portion may be provided to the security computing device also in near real time, along with the notification determined at 220. By providing the redacted version of the video portion to the security personnel, as opposed to a non-redacted version, the security personnel are able to focus quickly on the individual of interest rather than numerous other individuals who may otherwise be visible in the video portion.

In some examples, the redacted video portion or non-redacted video portion may be forwarded immediately by default to the security computing device with a notification of the relevant priority score(s). Alternatively, in other examples, the determination as to whether to forward a video portion immediately (either with redactions or without redactions) without the video portion first being redacted and reviewed by the reviewer on the client computing device may be performed in response to a perceived threat level based on the severity of the priority score. For example, if an individual in a video portion has been assigned a priority score of 85 or higher, the individual may be perceived as a potential immediate threat and the video portion may be forwarded immediately to the security computing device (with or without redaction) along with a notification that the individual has been associated with a very high priority score. As still another alternative, as discussed below, the video portion might not be forwarded to the security computing device until after redaction of the non-targeted faces in the video portion and after review by the reviewer on the client computing device, such as in the case that the video portion is being sent to a third party.

At 230, the computing device may send the notification including priority information and the corresponding video portion(s) (redacted and/or unredacted) to the client computing device. As mentioned above, in some cases, the video portion sent to the security computing device may be redacted to assist the security personnel in focusing on the individual of interest, while in other cases the video portion sent to the security computing device may be unredacted, and may include, for example, a visual indication of one or more faces of interest in the video portion.

At 232, the client computing device may receive at least the redacted video portion from the service computing device and may present the redacted video portion in a user interface (UI) on the client device. For example, receipt of the redacted video portion from the service computing device may cause the client application on the client computing device to present the video portion in the UI on the client computing device along with an indication of one or more faces of interest in the video portion. Further, in some cases, the reviewer access a UI that enables selecting one or more faces indicated for redaction to remain unredacted based on review of the unredacted video portion.

At 234, the client computing device may receive, via a UI, a selection of missed faces for redaction or faces indicated for redaction to remain unredacted. For example, the reviewer may use the UI on the client computing device to select one or more areas in the video portion in which non-targeted faces were not properly redacted.

At 236, the client computing device may send instructions to redact missed faces, if any, or to not redact a selected face, to the service computing device. For example, the client computing device may communicate with the service computing device via one or more APIs, or through other techniques, and may send an indication to the service computing device of one or more locations in the video portion where additional redaction is to be performed or not performed.

At 238, the computing device may receive the instructions from the client computing device and, based on the instructions, may perform additional redaction, if any, to the video portion or may otherwise update the redacted video.

At 240, the computing device may send the redacted video portion to the external computing device and/or to a security computing device, such as internal security or law enforcement. In some examples, the redacted video may be provided to an external computing device such as a web server, or the like, which may make the redacted video available to news media, and or other members of the public. Additionally, or alternatively, the redacted video may be provided to a security computing device such as a member of the organization's security, or to law enforcement, such as for association with a case folder, as discussed additionally below.

At 242, in some examples, the reviewer may periodically check to determine the accuracy of the emotion detection being performed by the service computing device. Accordingly, the client computing device may present the non-redacted version of the video portion to the reviewer in the UI on the client device as discussed above with respect to block 232, along with an indication of detected emotions. The reviewer may use the UI to select any faces for which emotions appear to have been misinterpreted.

At 244, the client computing device may log any indications of misinterpreted emotions and may send the log to the service computing device for use in subsequently retraining the emotion detection machine learning model. Accordingly, the emotion detection model may become more accurate over time based on the retraining.

Figure 3:
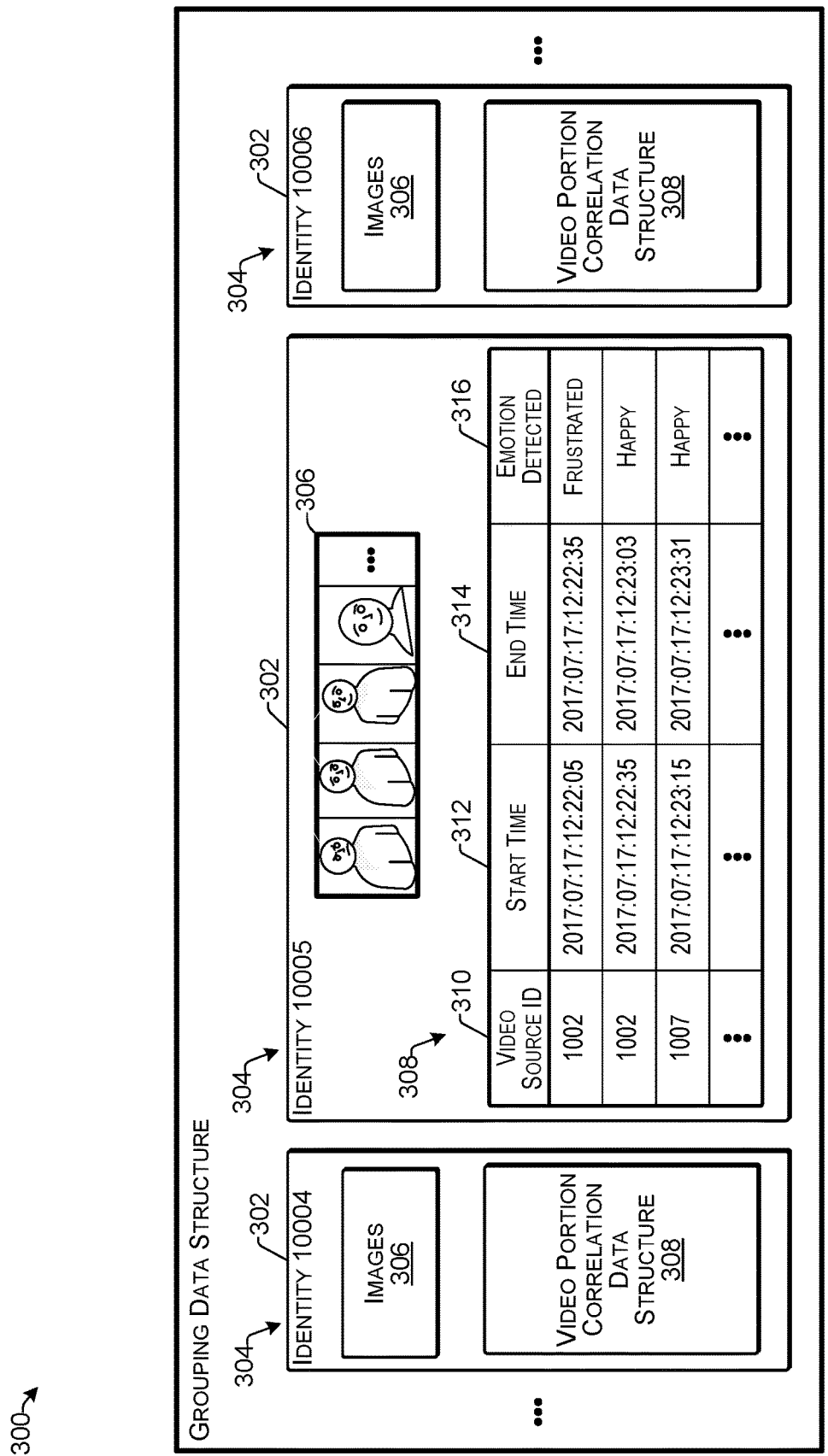
FIG. 3 illustrates an example grouping data structure according to some implementations.

FIG. 3 illustrates an example grouping data structure 300 according to some implementations. In this example, when a face is detected in a video portion, recognition is performed so that grouping program may compare the face with faces already associated with identities in the grouping data structure 300. For example, the grouping program discussed above with respect to FIG. 1 may be executed for using facial recognition matching techniques to compare the recognized face with faces associated with existing identities in the grouping data structure 300.

The grouping data structure 300 may include a plurality of identities 302, and each identity 302 may be associated with an identity identifier (ID) 304. Furthermore, each identity 302 may include one or more images 306 or at least stored facial recognition image features that associate the identity 302 with one or more recognized faces detected in one or more video portions. Furthermore, each identity 302 may include a video portion correlation data structure 308 that identifies at least one portion of video with which the identity is associated and an emotion detected in that video portion for the corresponding individual. In the illustrated example, the video portion correlation data structure 308 includes a video source identifier 310, a start time 312 for the video portion at which the face is first detected in the camera field of view, an end time 314 at which the face leaves the camera view of view, and an emotion detected 316. If multiple emotions are detected in the video portion from the same camera without the face leaving the field of view, a new entry may be made in the data structure 308 indicating the start time of the new emotion. In this case, the end time 314 of the previous entry may be the same as the start time 312 of the new emotion. Accordingly based on the information contained in the video portion correlation data structure 308, it is possible to determine a particular video portion that contains the face of the targeted individual and the emotion(s) detected in that video portion.

When the video processing program is analyzing a new video portion, the grouping program may initially attempt to associate the face with an existing identity using the facial recognition program discussed above with respect to FIG. 1. If the grouping program is unable to locate an existing identity, the grouping program may create a new identity, assign a new identity identifier 304 to the new identity, and create a new entry in the video portion correlation data structure 308 for the new identity 302. On the other hand, if the grouping program is able to locate an existing identity 302, then the information regarding the new video portion and the associated detected emotion may be added as a new entry to the existing video portion correlation data structure 308 in the existing identity 302.

Furthermore, as mentioned above, when a face expressing an emotion of interest is detected, the face may be tracked in the current video portion and other video portions within a time threshold of the existing video portion. The grouping program may add information from these other video portions to the identity for the individual along with the emotion detected in the other video portions. Accordingly, in the indicated example, suppose that the individual associated with identity 10005 is detected in a video portion from video source 1002 as being frustrated and subsequently is determined to be happy while still being in the field of view of the same camera. The individual is tracked in that video portion and in another video portions from another video source, such as in a video portions taken within several minutes of the first video portion through a nearby camera. Accordingly, the other video portion(s) may be grouped with the initial video portion and may be used when determining a priority score for the identity 302 corresponding to the face. Additionally, in some examples, the video portion correlation data structure 308 may include tracking information (not shown in FIG. 3) that includes the coordinates of the respective face for each video portion for a plurality of points in time, as determined by the face tracking program.

FIG. 4 illustrates an example priority data structure 400 according to some implementations. In this example, the priority data structure 400 includes a prioritized listing of individuals based on a priority score. The priority data structure 400 includes a priority 402, and identity ID 404, a priority score 406, and detected emotions 408. The priority data structure 400 may be associated with one or more video portions, and may be provided to internal security personnel, law enforcement personnel, or other security personnel to provide an indication of targeted individuals in the one or more video portions. Accordingly, a different priority data structure may be generated for each video portion or a group of video portions that include the same identity that has been detected as having an emotion of interest. The identity ID 404 may be used to refer to the grouping data structure to retrieve video portion identifying information and, in some cases, coordinates of the corresponding face in the video portion(s).

In this example, a first individual associated with identity ID 10009 was detected in the one or more video portions as being angry 90 percent of the time and normal 10 percent of the time. Accordingly, based on this information, the first individual is assigned a priority score of $90/100$ or 90 percent, indicating that the individual has a high perceived potential for performing a bad act. Furthermore, a second individual associated with identity ID 10002 was detected as being angry 30 percent of time, frustrated 40 percent of the time, and sad 30 percent of the time. Accordingly, the second individual is assigned a priority score of 70 percent based on the combination of the detection of the anger emotion and the frustration emotion which are both emotions of interest, and therefore combined when determining the priority score. In addition, a third individual associated with identity ID 10018 was detected as being frustrated 40 percent of the time normal 30 percent of the time and happy 30 percent of the time. Based on the detection of the frustration emotion, this individual is assigned a priority score of 40 percent. Furthermore, while example data structures are described herein for discussion purposes, numerous other possible data structures and combinations of data structures will be apparent to those of skill in the art having the benefit of the disclosure herein.

Figure 5:
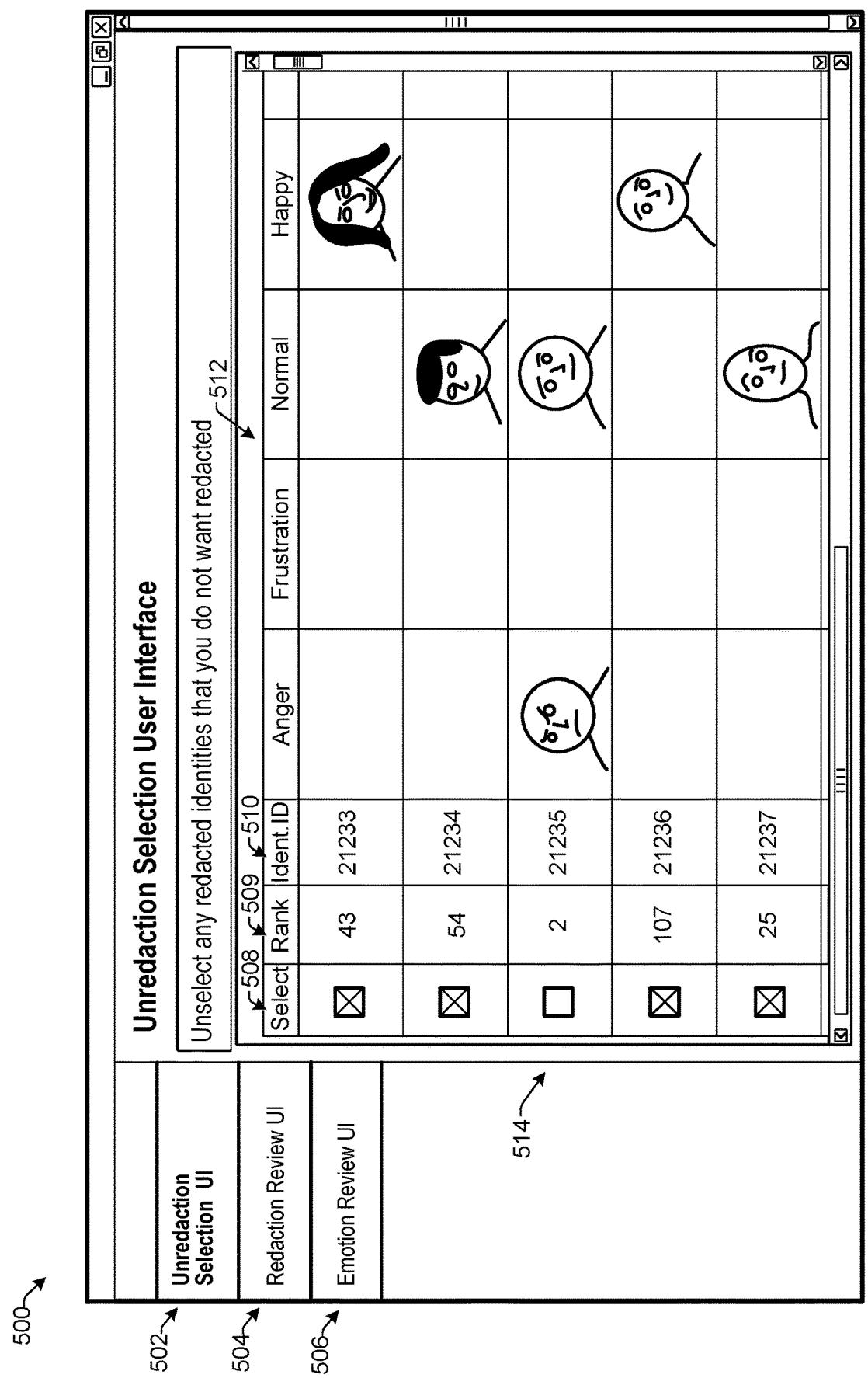
FIG. 5 illustrates an example user interface according to some implementations.

FIG. 5 illustrates an example user interface (UI) 500 according to some implementations. For example, the UI 500 may be presented on the client computing device to enable a reviewer to review the faces that are redacted in the redacted video portion in unredacted form for determining whether any faces selected to redacted should be unselected so as to not be redacted. As illustrated, the reviewer may select among the unredaction selection UI at 502, a redaction review UI at 504, or an emotion review UI at 506.

The UI 500 presents faces detected in the video portion that have been selected for redaction, such as may be obtained from an unredacted version of the video portion. The UI 500 includes a selection column 508 with an interactive select/deselect control (e.g., a checkbox) that the reviewer may use to select or deselect a face for redaction in the video portion. The UI 500 may further include ranking information 509, indicating a ranking of the respective identities, as discussed above, such as based on frequency, severity, and/or duration of the detected emotion(s) of interest in all of the videos in which the respective face appears. In addition, the UI 500 includes an identity ID 510 for each identity to be redacted in the video portion, and an indication of one or more emotions 512 detected for the identity in the video portion. The reviewer may review the faces for redaction and may select a face, such as at 514 that the reviewer determines should not be redacted in the video portion. In some cases, the ranking 509 may be used by the reviewer when determining whether a corresponding face may be redacted. Further, in some examples, the review may select the ranking column 509 to cause the identities 510 to be presented in the UI 500 in order according rank. The UI may send any selections or deselections made back to the service computing device, which may reprocess the redaction of the video portion based on the selections/deselections.

Figure 6:
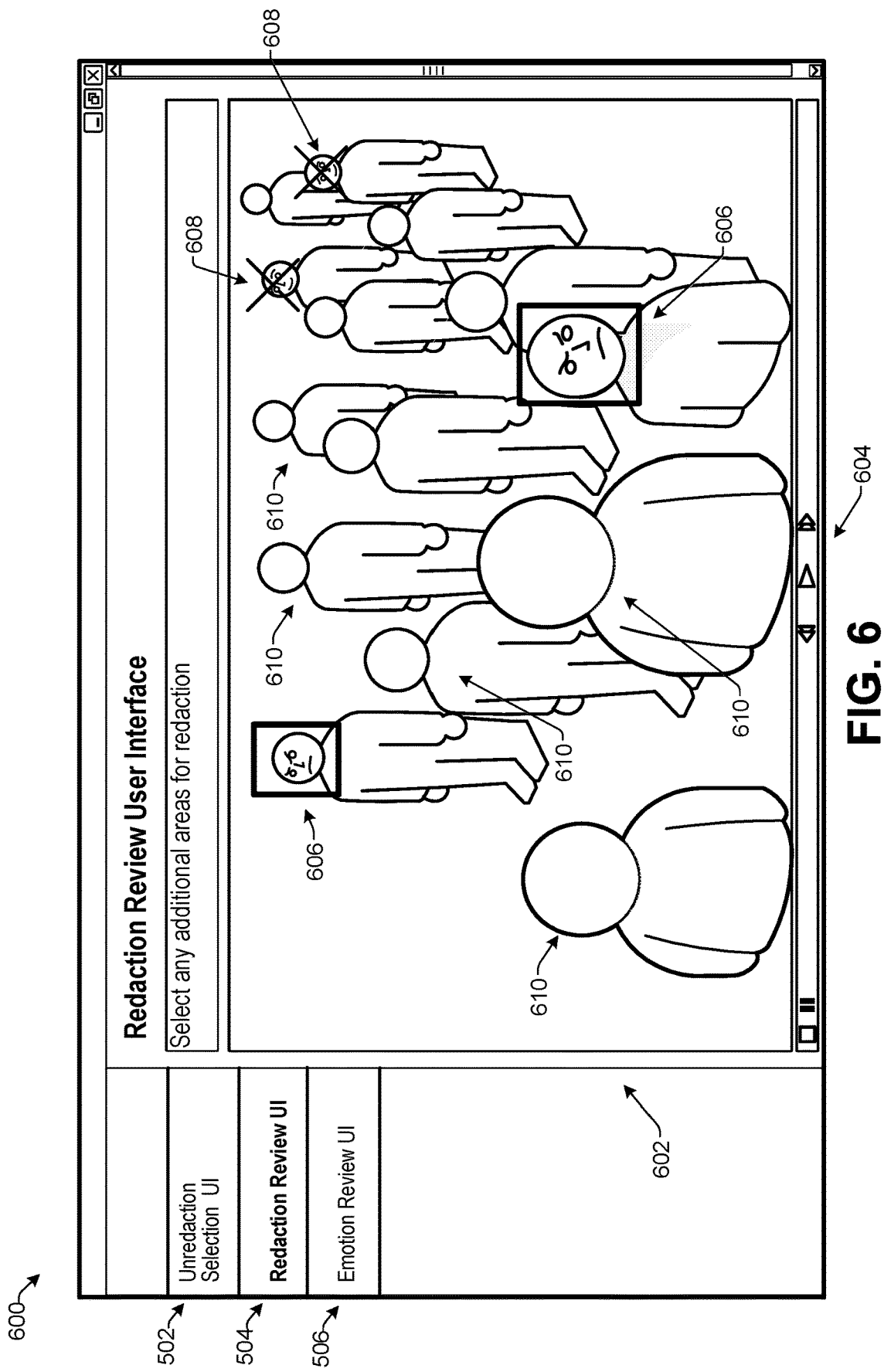
FIG. 6 illustrates an example user interface according to some implementations.

FIG. 6 illustrates an example user interface (UI) 600 according to some implementations. As indicated at 602 the redaction review UI has been selected in the UI 600. For example, the UI 600 may be presented on the client computing device to enable a reviewer to review the redacted video for any additional areas that require redaction.

A video portion 602 may be presented in the UI 600 and may be controlled by controls 604, such as for scrolling through the video portion 602. In addition, the video portion 602 may include one or more faces of interest that have been identified by the emotion determination program. As indicated at 606, the face of interest may be marked by a visual indicator such as a circle, square, highlighting, or other various other types of visual indicator effects.

In addition, when the reviewer determines there are areas of the video portion 602 that still need to be redacted, the reviewer may mark these areas using any suitable type of visual indicator 608. As discussed above, when the reviewer has finished reviewing the video 602, the client application may send redaction instructions back to the service computing device to perform further redaction on the video portion 602. Subsequently, the reviewer may again review the video portion 602 and/or may indicate that the video portion is ready to be forwarded to an external computing device or the like.

As discussed above, the reviewer may periodically review unredacted videos to determine the effectiveness of the emotion detection algorithm and to log any incorrectly detected emotions, such as for retraining of the emotion detection machine learning model. In some examples, the emotion review UI 506 may be similar to the unredaction selection UI 500 discussed above with respect to FIG. 5, but instead of selecting an identity for redaction, the reviewer may select an identity for which the emotion appears to have been incorrectly detected. The reviewer may drag an incorrectly analyzed face image in the UI to the correct emotion column and/or may otherwise log the incorrect emotion detection. The log information may subsequently be used to retrain the emotion detection machine learning model on a periodic basis.

Figure 7:
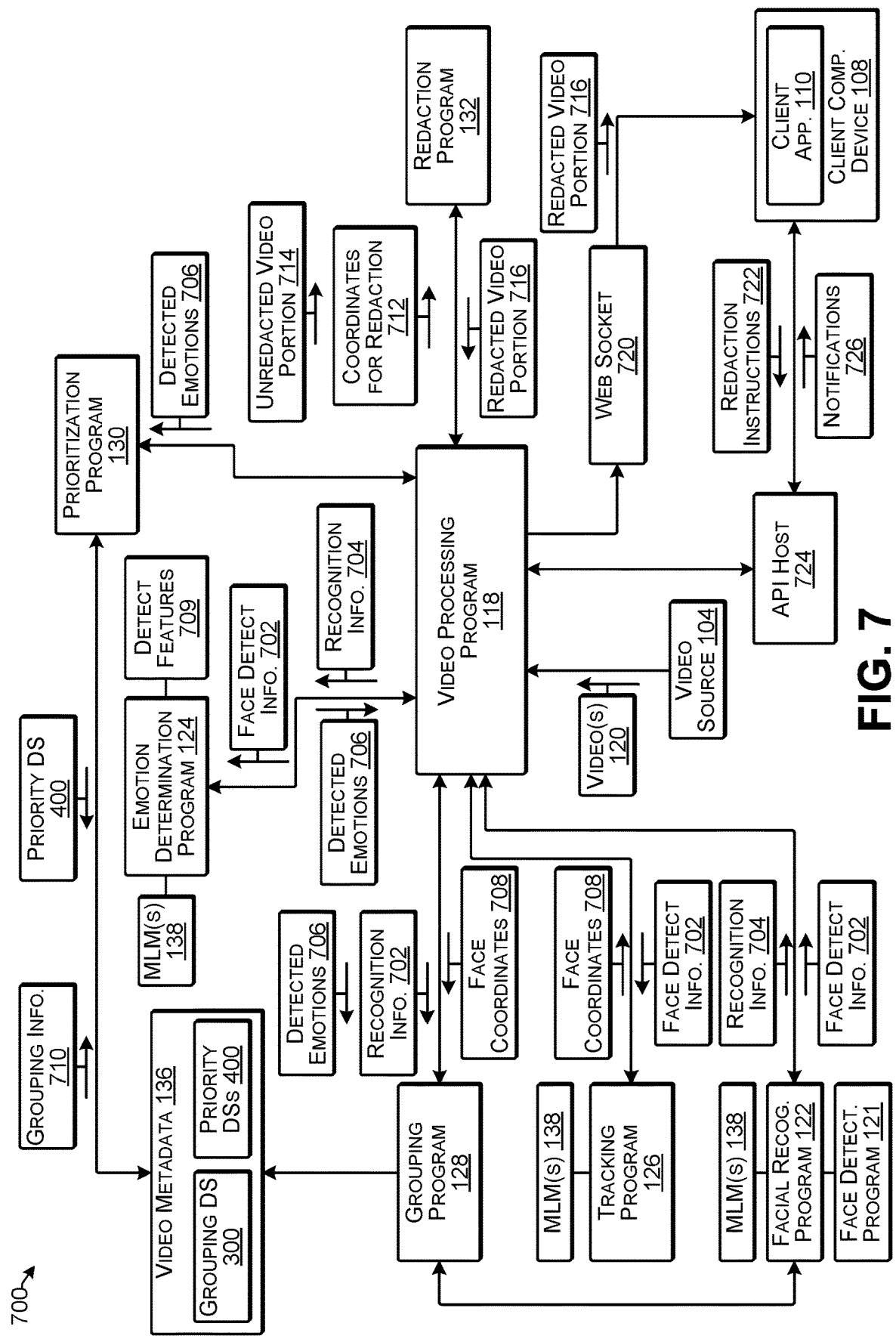
FIG. 7 illustrates a logical configuration of a workflow engine for video processing according to some implementations.

FIG. 7 illustrates a logical configuration of a workflow engine 700 for video processing according to some implementations. In this example, the video processing program 118 may manage the overall workflow of the workflow engine 700 and may utilize or otherwise access the face detection program 121, the facial recognition program 122, the emotion determination program 124, the tracking program 126, the grouping program 128, the prioritization program 130, and the redaction program 132. As mentioned above, the video processing program 118 may receive one or more videos 120 via live streaming from a streaming server or other video source 104, or as a file from a storage location or other video source 104. Accordingly, an API may be used in some cases for receiving the streaming video and/or for retrieving the video(s) 120 from the storage location or other video source 104.

When one or more videos 120 are received, the video processing program 118 may divide each video into video portions, such as based on time segments. Alternatively, the video processing program may divide the video into video portions later, such as based on the presence of a face displaying features corresponding to an emotion of interest. Further, the video processing program 118 may employ the face detection program 121 to obtain face detection information 702. For example, the facial recognition program 122 may include the face detection program 121 in this example. In other examples, the face detection program 121 may be a separate program that is invoked separately. The face detection program 121 may include a face detection algorithm that uses any of various known techniques for detecting faces in the video frames of the video portion. For example, as is known in the art, the face detection algorithm may perform feature extraction from a frame of the video portion and apply one or more of the machine learning models (MLMs) 138 for decision-making with respect to the extracted features to correlate the extracted features with the shape and contours of the human face.

As one example, a face detection library may be used along with landmark detection in which facial features such as nose, mouth, and eyes are initially located and used to recognize the face even at different poses and angles. The face detection program 121 may further determine the coordinates of the detected faces on the video frame. For example, a virtual frame may be established around each detected face indicating the bounding area of each detected face. An identifier for each face may be returned for each frame with top, left, right, bottom of the bounding area recorded as coordinates for the face. As the face is tracked by the tracking program, as discussed below, the frame is moved and the new coordinates of the frame may be recorded. Further, when redaction is performed, the redaction may the redaction may be performed for the area of the image within the frame boundary.

In addition, the video processing program 118 may employ the facial recognition program 122 to recognize faces in the video frame such as for performing the grouping functions, as discussed additionally below. For example, the facial recognition program 122 may employ one or more of the machine learning models (MLMs) 138 to provide recognition information 704. Various facial recognition programs are commercially available that may be used for recognizing faces in the video portions and for matching recognized faces from other video portions and/or matching faces already contained in a grouping data structure (DS) 300 as discussed above. As one example, following detection of faces with a pre-trained face detection model, the detected face may be transformed for application to a neural network using real-time pose estimation with an affine transformation to try to make the eyes and bottom lip appear in the same location on each image. In some examples, the facial recognition program 122 may further use a deep neural network to represent (or embed) the face on a multi-dimensional unit hypersphere. The embedding may be a generic representation of a default face. The embedding has an effect that a larger distance between two embedded faces indicates that the faces are likely not of the same person. Clustering and/or classification techniques may then be applied to the features.

The face detection information 702 may be provided by the video processing program 118 to the tracking program 126, the grouping program 128, and the emotion determination program 124. The video processing program 118 may invoke the tracking program 126 to track the detected faces in the video portion. The tracking program 126 may use one or more machine learning models 138 or various other algorithms for tracking the coordinates of each detected face. The tracking program 126 may employ face detection techniques for tracking individual ones of the faces across the multiple video frames as the faces progress across a plurality of video frames or remain stationary in the video frames. Video tracking programs are known in the art and are commercially available. Thus, the tracking program 126 may provide the face coordinates 708 of the detected faces. In some examples, the tracking program 126 may provide coordinates of all faces to be redacted from the video portion as the face coordinates 708. The face coordinates 708 may also include the face coordinates of any faces displaying emotions of interest, as discussed additionally below, which are to remain unredacted.

The video processing program 118 may provide the face coordinates 708 and the recognition information 702 to the grouping program 128. The grouping program 128 may further invoke the facial recognition program 122, such as for attempting to match recognition information 702 for faces in a current video portion with faces previously recognized and stored in the grouping data structure 300. As mentioned above, the grouping program 128 may initially try to match identities already present in the grouping data structure 300 with currently recognized faces present in the video portion. If a match is not found, the grouping program 128 may create a new identity entry in the grouping data structure 300 for the respective unmatched face.

The grouping program 128 is able to use the recognition information to recognize faces that have left a video portion (i.e., left the camera's field of view) and subsequently returned later for including the subsequent video portions in the same identity based on matching the recognized faces. Further, the grouping program 128 may create separate identities in the grouping data structure for all faces in a video portion including the faces to be redacted.

In addition, the grouping program 128 may access map information or other camera location information for the video sources for determining other video sources likely to include a targeted individual when the targeted individual leaves the field of view of the first video portion corresponding to a first camera. For instance, the camera location information may indicate that a first camera has a field of view covering a first area and a second camera has a field of view covering an adjacent area toward which the targeted individual was walking. Accordingly, the grouping program 128 may use this information for accessing video from the second camera for approximately the same time and date as the video portion from the first camera when attempting to group video portions to the same identity in the grouping data structure 300.

The video processing program 118 may invoke the emotion determination program 124 for detecting emotions in the identities grouped by the grouping program 128. For instance, the emotion determination program 124 may receive the face detection information 702, and in some cases, the recognition information 704. The emotion determination program 124 may use one or more of the machine learning models (MLMs) 138 to determine emotions being portrayed by the faces indicated by the face detection information 702 in the video portion being analyzed. In some cases, the emotion detection process may be very similar to the facial recognition process applied above, but with the models trained for recognizing facial features indicative of different emotions. As one example, the emotion determination program may access a machine learning model 138 that use thousands of existing pictures to try and predict what a targeted face would look like smiling, frowning, crying, etc. As indicated at 709, a large number of different features on the face, such as corners of the mouth, eyebrows, eyelids, nostrils, position of the jaw, and so forth, may be detected, tracked, and compared to the pictures in the machine learning model 130 for determining whether the tracked features indicate an emotion of interest. The machine learning model 138 may classify a respective face into one of a plurality of discrete emotion classifications based on the tracked features.

Various emotion determination programs are commercially available that may be used for determining emotions in the faces in the video frames. In some examples, the emotion determination program may be executed on a number of different frames in the video portion to provide a strong sampling of the emotions being portrayed by each face in the video portion. For example, the emotion determination program 124 may be executed for video frames selected from every 5 seconds, 10 seconds, 20 seconds, 30 seconds, or the like, of the video portion. The detected emotions 706 may be sent to the video processing program 118, which may provide the detected emotions 706 to the grouping program 128 and the prioritization program 130 for inclusion in the grouping data structure 300 and the priority data structure 400 respectively.

The grouping program 128 may use the detected emotions 706 and the face coordinates 708 for determining the timing of the detected emotions 706, e.g., the duration of each detected emotion, and the frames of the video portion in which the face of each individual appears. Accordingly, the grouping program 128 is able to recognize when a face has left the video portion and subsequently returned, or entered a different video camera field of view, and include this information in the grouping data structure 300, as discussed above with respect to FIG. 3.

The prioritization program 130 may be invoked by the video processing program 118 for generating the priority data structures (DSs) 400. The prioritization program 130 may access grouping information 710 from the grouping data structure 300 and/or may use the detected emotions 706 for creating the priority data structures 400 and for determining priority scores for each targeted individual identified in the video portion. For example, the prioritization program 130 may access the grouping data structure 300 to obtain grouping information and may further receive the detected emotions 706 for identifying targeted individuals. The prioritization program 130 may use this information to generate a priority DS for the corresponding video portion. An example of the priority data structure 400 and the determination of priority scores is discussed above with respect to FIG. 4.

The video processing program 118 may send coordinates for redaction 712 and the unredacted video portion 714 to the redaction program 132. For instance, the video processing program 118 may provide the original video (and audio) with redaction information (e.g., coordinates for redaction 712) to the redaction program 132. The redaction program 132 may be configured to output a new version of the video portion with redaction effects applied to the specified coordinates. Thus, the input to the redaction program 132 is the raw video and a separate file that contains the redaction information, and the output is a single redacted video file, i.e., the redacted video portion 716. The redaction program 132 may apply redaction effects to the unredacted video portion 714 at the locations in each frame of the video portion 714 specified by the received coordinates for redaction 712. For example, the redaction program 132 may blur out the faces corresponding to the coordinates for redaction 712 or may apply various other video effects for making the faces illegible or otherwise unrecognizable in the video portion 716. The coordinates for redaction 712 may be determined based on the face detection information 702 and/or the face coordinates 708 provided by the tracking program 126, and may include all faces in the unredacted video portion 714 except for the faces of the targeted individuals. The redaction program 132 may return the redacted video portion 716 to the video processing program 118 or may directly access a web socket 720, as discussed below.

The video processing program 118 may employ a web socket 720 or other suitable technique for delivering the redacted video portion 716 to the client application 110 at the client computing device 108. The web socket 720 may enable two-way communication so that the reviewer at the client computing device 108 can send back any changes to be applied to the redacted video portion 716. As described above with respect to FIGS. 1, 2, 5, and 6, the reviewer at the client computing device 108 may review the redacted video portion 716 and if there are any additional areas requiring redaction, may send redaction instructions 722 to the video processing program 118. In some cases, the instructions 722 may be sent back through the socket 720. In other examples, the instructions 722 may be sent via an API, such as through an API host 724. Furthermore, in some cases, the video processing program 118 may send one or more notifications 726 to the client application 110 corresponding to the redacted video portion 716. For example, the one or more notifications 726 may indicate the emotions detected in the redacted video portion 716, an associated priority, or the like. Furthermore, in some examples, rather than employing the web socket 720, the video processing program 118 may send the redacted video portion 716 to the client application 110 via one or more APIs or through various other communication techniques.

Figure 8:
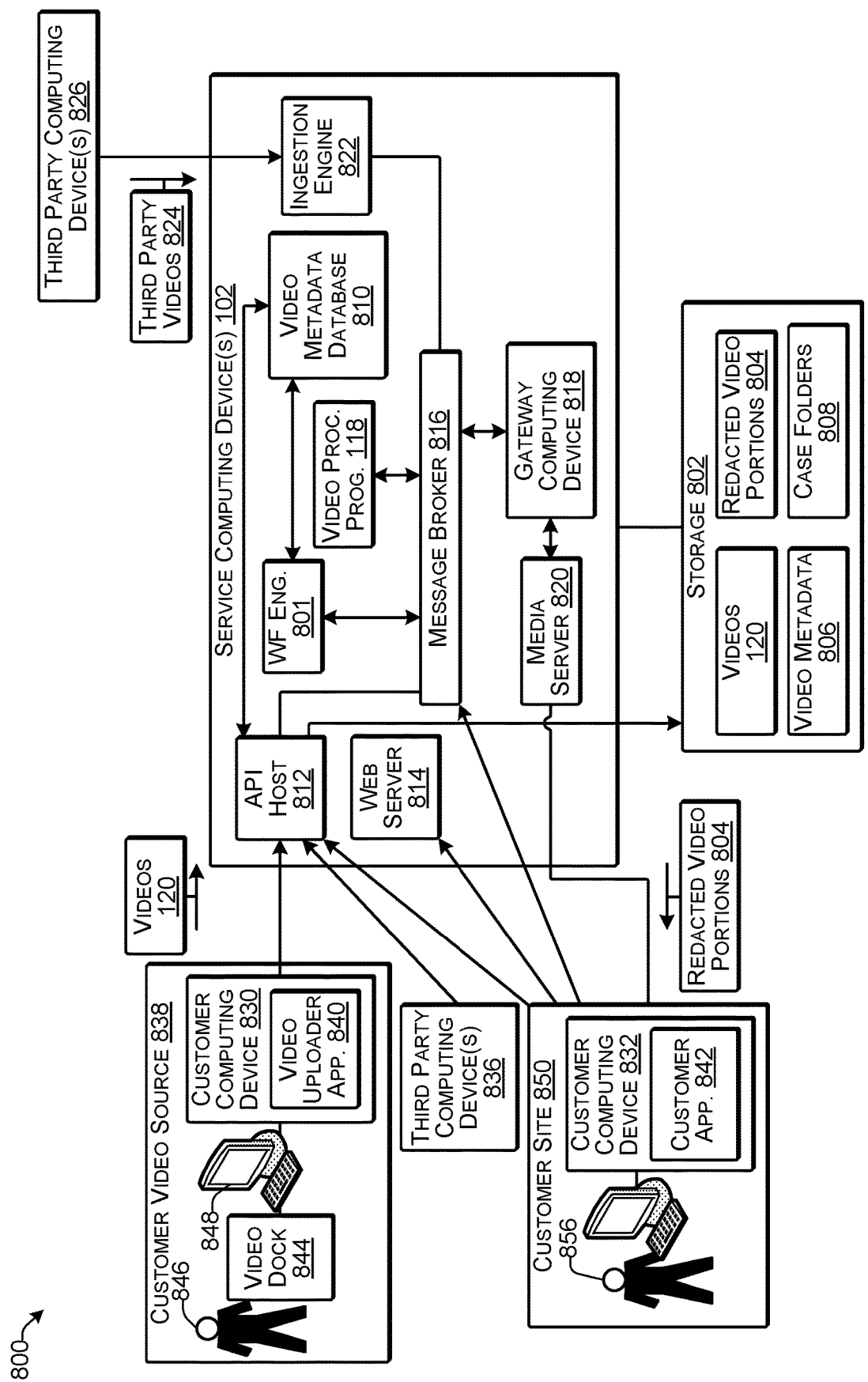
FIG. 8 illustrates an example video processing system employing the techniques described herein according to some implementations.

FIG. 8 illustrates an example video processing system 800 employing the techniques described herein according to some implementations. As one example, a customer in this example may be a law enforcement agency or other security customer, who may use the video processing system herein for digital evidence management. For instance, with the addition of body cameras, dash cameras, and the like, to many police departments, police departments are being force to manage an ever-increasing amount of digital video data. Accordingly, the video processing system 800 herein may handle digital video ingestion, sharing the videos in a secure manner with multiple resources or entities, associating metadata with the videos, and may provide the ability to search a large number of stored video portions for individuals of interest based on the techniques herein. For example, video can be selected and added directly as evidence to a case folder. Furthermore, the case folders including processed video may be tracked as part of an evidence management feature for storing digital evidence and also creating a chain of custody of the evidence within a case. Implementations herein make the searching of large amounts of video feasible for locating suspects for a specific case. For example, using the redaction techniques herein, the redacted video portions can be shared with other agencies or to the public by automatically having the non-targeted faces recognized and redacted.

The system 800 corresponds to a more specific implementation of the system 100 described above, and includes the service computing device(s) 102 and a workflow engine 801, which may correspond to the workflow engine 700, as described above with respect to FIGS. 1 and 7, and which may be capable of executing the process 200 of FIG. 2, as well as other video processing and storage functions.

The service computing device 102 is in communication with a storage 802, such as an object storage system, which may provide storage capacity for the service computing devices 102 for storage of data, such as file data or other object data. Examples of data stored in the object storage 802 may include videos 120, redacted video portions 804, video metadata 806, and case folders 808. The storage 104 may include storage arrays such as network attached storage (NAS) systems, storage area network (SAN) systems, or storage virtualization systems. Further, the storage 104 may be co-located with one or more of the service computing devices 102, and/or may be remotely located or otherwise external to the service computing devices 102.

Furthermore, in this example, the service computing devices 102 may include or may access a video metadata database 810, an API host 812, a web server 814, a message broker 816, a gateway computing device 818, a media server 820, and an ingestion engine 822. For example, the ingestion engine 822 may be configured to receive third party videos 824 from one or more third party computing devices 826. For example, third party videos 824 may be surveillance videos, security videos, social media videos, or the like, provided by various third-party sources such as municipal cameras, or cameras of various other corporate or private entities. The ingestion engine 822 may receive these third party videos 824 and may pass these videos to the workflow engine 700 to perform video processing, emotion detection, and redaction of non-targeted faces, as discussed above.

The message broker 816 may pass messages between the various components and between the various component and one or more customer and/or external computing devices. The message broker 816 is an intermediary program module that translates a message from the messaging protocol of the sender to the messaging protocol of the recipient. For example, the video processing program may be connected to the message broker, as illustrated, and may listen to video analysis requests. Further, the gateway computing device 818 may serve as a gateway for customer computing devices to access the objects in the storage 802. Additionally, the media server 820 may deliver video portions and other objects to the customer computing devices, such as by downloading, streaming, or the like.

The example of FIG. 8 illustrates several possible computing devices that may access or otherwise communicate with the service computing device(s) 102, including a first customer computing device 830, a second customer computing device 832, and a third party computing device 836. For instance, suppose that the first customer computing device 830 is a customer video source 838, and includes a video uploader application 840 and the second client computing device includes customer application 842, which in some examples may be a web application or a video viewer application. In some examples, the applications 840 and 842 may each be different modules of the same application, may be separate applications that are unrelated to each other, or any combination thereof.

The video uploader application 840 may be configured to receive a video 120 and upload or otherwise send the video 120 to the service computing device(s) 102 via the API host 812. As one example, a video dock 844 may be connected to the customer computing device 830 to enable a law enforcement officer or other user 846 to offload videos 120 to the customer computing device 830 to be subsequently sent to the storage computing device 102 for storage and archiving. For instance, in the case of a body-worn camera (not shown in FIG. 8), the user 846 may be a law enforcement officer who has finished a shift and who is transferring data from the body-worn camera to the customer computing device 830.

The customer computing device 832 at a customer site 850 may include customer application 852, which may be a web application able to access the web server 814, or a dedicated application configured to access the API host 812 and communicate with the message broker 816 and/or the media server 820. For example, the customer application 842 may access the service computing devices 102 to download one or more of the redacted video portions 804. In some examples, a user 856 may be the same user as the user 846 who uploaded a corresponding video 120. In other examples, the user 856 may be a different user such as other law enforcement personnel, a prosecuting attorney, or the like.

As one example, the user 856 may execute the customer application 852 to view a GUI that presents a search and/or browsing screen to enable the user 856 to locate and view or otherwise access a particular redacted video portion 804, such as by sending a search query to the API host 812 or the web server 814. In response, the API host 812 or web server 814 may cause the media server 820 to retrieve the requested video portion from the storage 802 and send the redacted video portion 804 to the customer computing device 832. In some examples, the redacted video portion 804 may have been added to, or otherwise associated with a case folder 808 for a particular case, and the user 856 may request and receive the entire case folder with the redacted video portion 804 included for chain of custody tracking.

Additionally, in some cases, a third party computing device 836 may be able to access the service computing devices 102. For example, the third party computing device 836 may be associated with a different agency, a member of the public, such as a news or media company, or the like. Thus, the third party computing device may be able to access one or more of the redacted video portions with fewer privacy concerns, as the non-targeted faces are redacted form the redacted video portions 804.

The example processes described herein are only examples of processes provided for discussion purposes. Numerous other variations will be apparent to those of skill in the art in light of the disclosure herein. Further, while the disclosure herein sets forth several examples of suitable systems, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, configure the one or more processors to perform operations comprising:
receiving a video from a video source;
detecting a plurality of faces in a first video portion of the received video;
determining that a first face of the plurality of faces has features indicative of an emotion of interest;
based on determining the first face has the features indicative of the emotion of interest, redacting other faces of the plurality of faces while leaving the first face unredacted in the first video portion;
sending the first video portion with the first face unredacted and the other faces redacted to at least one computing device;
determining a percentage of time that the first face has the features indicative of the emotion of interest;
assigning a priority to the first face based on the percentage of time; and
sending information related to the priority to the at least one computing device with the first video portion.

2. The system as recited in claim 1, the operations further comprising:
matching the first face with an image of a previously stored face, wherein the previously stored face is associated with a second video portion received from a different video source than the first video portion; and
storing an indication of the emotion of interest and identifying information for the first video portion in association with the previously stored face.

3. The system as recited in claim 1, wherein sending the first video portion to the at least one computing device comprises sending the first video portion to a security computing device with an indication of the emotion of interest associated with the first face.

4. The system as recited in claim 1, wherein sending the first video portion to the at least one computing device comprises sending the first video portion to a client computing device executing a client application to cause the client application to present the first video portion in a user interface for review by a reviewer.

5. The system as recited in claim 4, the operations further comprising:
receiving from the client computing device, via the user interface, an indication of one or more of the other faces remaining unredacted; and performing additional redaction on the first video portion to redact the one or more of the other faces.

6. The system as recited in claim 1, wherein the operation of determining the percentage of time that the first face has the features indicative of the emotion of interest is based on a percentage of time in the first video portion and in a second video portion, wherein the first face is detected has having features indicative of an emotion not of interest for a percentage of the time that the first face is present in at least one of the first video portion or the second video portion.

7. The system as recited in claim 1, wherein the video is received from a first video source via a first application programming interface (API) host, and provided to a video processing program executed by the one or more processors to determine the first video portion with the first face unredacted and the other faces redacted, the operations further comprising:
storing the first video portion in an object storage;
receiving, from a customer computing device, via the API host a request to access the first video portion; and
providing the first video portion to the customer computing device via a media server.

8. The system as recited in claim 1, wherein the operation of sending the first video portion with the first face unredacted and the other faces redacted to at least one computing device comprises sending the first video portion to a computing device that makes the first video portion publicly accessible, wherein the redacting the other faces causes the other faces to be unrecognizable in the first video portion.

9. The system as recited in claim 1, wherein the emotion of interest is one of anger, frustration, hatred, or distress.

10. A method comprising:
receiving, by one or more processors, a video from a video source;
detecting a plurality of faces in a first video portion of the received video;
detecting that a first face of the plurality of faces has features indicative of an emotion of interest not detected in other faces of the plurality of faces;
based on detecting the features indicative of the emotion of interest in the first face, redacting the other faces of the plurality of faces and not redacting the first face in the first video portion;
sending the first video portion with the first face not redacted and the other faces redacted to at least one computing device;
determining a percentage of time that the first face has the features indicative of the emotion of interest;
assigning a priority to the first face based on the percentage of time; and
sending, to the at least one computing device, with the first video portion, information related to the priority.

11. The method as recited in claim 10, wherein determining the percentage of time that the first face has the features indicative of the emotion of interest is based on a percentage of time in the first video portion and in a second video portion, wherein the first face is detected has having features indicative of an emotion not of interest for a percentage of the time that the first face is present in at least one of the first video portion or the second video portion.

12. The method as recited in claim 10, wherein the video is received from a first video source via a first application programming interface (API) host, and provided to a video processing program executed by the one or more processors to determine the first video portion with the first face unredacted and the other faces redacted, the operations further comprising:
storing the first video portion in a storage;
receiving, from a client computing device, via the API host a request to access the first video portion; and
providing the first video portion to the client computing device via a server.

13. The method as recited in claim 10, further comprising:
matching the first face with an image of a previously stored face, wherein the previously stored face is associated with a second video portion received from a different video source than the first video portion; and
storing an indication of the emotion of interest and identifying information for the first video portion in association with the previously stored face.

14. The method as recited in claim 10, wherein sending the first video portion to the at least one computing device comprises sending the first video portion to a security computing device with an indication of the emotion of interest associated with the first face.

15. The method as recited in claim 10, wherein sending the first video portion with the first face unredacted and the other faces redacted to at least one computing device comprises sending the first video portion to a computing device that makes the first video portion publicly accessible, wherein the redacting the other faces causes the other faces to be unrecognizable in the first video portion.

16. One or more non-transitory computer-readable media storing instructions that, when executed by one or more processors, program the one or more processors of a system to:
receive a video from a video source;
detecting a plurality of faces in a first video portion of the received video;
determining that a first face of the plurality of faces has features indicative of an emotion of interest;
based on determining the first face has the features indicative of the emotion of interest and other faces of the plurality of faces of the plurality of faces do not include the features indicative of the emotion of interest, redacting the other faces from the first video portion while leaving the first face unredacted in the first video portion; and
sending the first video portion with the first face unredacted and the other faces redacted to at least one computing device,
wherein the emotion of interest is a first emotion of interest, the operations further comprising:
determining that a second face of the plurality of faces has features indicative of the first emotion of interest and a second emotion of interest;
determining a first percentage of time that the first face has the features indicative of the first emotion of interest;
determining a second percentage of time that the second face has the features indicative of the first emotion of interest and determining a third percentage of time that the second face has features indicative of the second emotion of interest;
assigning a first priority score to the first face based on the first percentage; and
assigning a second priority score to the second face based on the second percentage plus the third percentage.

17. The one or more non-transitory computer-readable media as recited in claim 16, wherein the one or more processors are further programmed to rank the second face as having a higher priority in a priority data structure than the first face based on the second percentage plus the third percentage being greater than the first percentage.

18. The one or more non-transitory computer-readable media as recited in claim 17, wherein the one or more processors are further programmed to send priority information from the priority data structure to a security computing device with the first video portion, wherein the first face and the second face are unredacted in the first video portion.

19. The one or more non-transitory computer-readable media as recited in claim 16, wherein the one or more processors are further programmed to:
   match the first face with an image of a previously stored face, wherein the previously stored face is associated with a second video portion received from a different video source than the first video portion; and
   store an indication of the emotion of interest and identifying information for the first video portion in association with the previously stored face.

20. The one or more non-transitory computer-readable media as recited in claim 16, wherein sending the first video portion to the at least one computing device comprises sending the first video portion to a security computing device with an indication of the emotion of interest associated with the first face.

* * * * *